US008077852B1

(12) United States Patent
Das et al.

(10) Patent No.: US 8,077,852 B1
(45) Date of Patent: Dec. 13, 2011

(54) METHOD AND APPARATUS FOR CONTROLLING CONFERENCE CALLS

(75) Inventors: Sreerupa Das, Arvada, CO (US); ShengXiang Gui, Broomfield, CO (US); Ashis Maity, Arvada, CO (US); Joseph McCabe, Pueblo, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 889 days.

(21) Appl. No.: 12/151,494

(22) Filed: May 7, 2008

(51) Int. Cl.
*H04M 3/42* (2006.01)
(52) U.S. Cl. .................... 379/202.01; 370/260; 709/204
(58) Field of Classification Search ............. 379/202.01, 379/204.01, 205.01
See application file for complete search history.

(56) References Cited

U.S. PATENT DOCUMENTS

| 5,369,694 A | 11/1994 | Bales |
| 5,373,549 A | 12/1994 | Bales |
| 5,408,526 A | 4/1995 | McFarland |
| 5,825,858 A | 10/1998 | Shaffer |
| 6,219,412 B1 | 4/2001 | Wellner |
| 6,330,320 B1 | 12/2001 | Cornell |
| 6,438,111 B1 | 8/2002 | Catanzaro |

*Primary Examiner* — Creighton Smith
(74) *Attorney, Agent, or Firm* — John C. Moran

(57) ABSTRACT

A conference manager establishes and controls a conference and subconferences for a plurality of telecommunication terminals so as to reduce telecommunication costs by establishing the conference and dynamically placing telecommunication terminals geographically located with conference or isolated remote telecommunication terminals geographically located remote from the conference into the conference. The conference manager requests that other conference managers establish subconferences to conference together remote telecommunication terminals that are geographically located together. The conference manager requests that the other conference managers extend these subconferences to the conference. Further, the conference manager controls the other conference managers to interconnect the subconferences if the conference manager determines that communicating cost can be lowered by interconnecting two or more of the subconferences. Telecommunication costs include telecommunication transport costs and/or conference port costs.

15 Claims, 5 Drawing Sheets

METHOD AND APPARATUS FOR CONTROLLING CONFERENCE CALLS

TECHNICAL FIELD

This invention relates to controlling a conference call distributed among a plurality of conference bridges.

BACKGROUND OF THE INVENTION

Within the prior art, it is well known to have both prearranged conferences and conferences where one caller dials into conferencing system and then controls that system so that it outdials to the other participants. The prearranged conferences can be where all of the participants dial into a prearranged number and at a prearranged time to establish a so-called "meet me" conference. The other type of prearranged conference is where the conferencing system itself calls each of the participants at the proper time. One of the problems that exist within the global economy for both audio only and multimedia conferences is the fact that the participants may be situated around the globe with some groups of the participants each located in a different country. When a single conference bridge is utilized, the telecommunication costs for each participant not located in the same geographical location as the conference bridge can be high. During the course of a conference, new people may be added to the conference whose presence had not been anticipated. Depending on their geographical location, these new people could add to the cost of the conference.

SUMMARY OF THE INVENTION

A method and apparatus establish and control a conference and subconferences for a plurality of telecommunication terminals so as to reduce telecommunication costs by a conference manager establishing the conference on a local switch by the conference manager; adding each telecommunication terminal into the conference upon each telecommunication terminal requesting addition and being geographically located with the local switch; adding each telecommunication terminal into the conference by the conference manager upon each telecommunication terminal requesting addition and being geographically remote from the local switch but the only the telecommunication terminal in its geographically location; requesting by the conference manager that each remote conference manager establish a subconference between each first set of telecommunication terminals in the conference and geographically located with each remote conference manager and extend each of subconferences to the conference; adding each telecommunication terminal requesting addition and being geographically remote from the local switch into a subconference geographically located with each telecommunication terminal; and requesting by the conference manager that a first and second remote conference manager extend a first subconference controlled by the first remote conference manager to the second subconference controlled by the second remote conference manager.

A method and apparatus pre-arranges a conference for a plurality of telecommunication terminals so as to reduce telecommunication costs by a conference arranger receiving from a data terminal associated with one of the plurality of telecommunication terminals a request to arrange a conference wherein the request includes the identity of data terminals to be contacted and a approximate time for the conference; contacting the identified data terminals to determine a time for the conference using the approximate time and identity of each of the telecommunication terminals associated with the identified data terminals to determine a time of the conference; determining assignments of the plurality of telecommunication terminals to the conference and subconferences and interconnection of subconferences to minimize telecommunication cost; communicating to a conference manager controlling the conference the time of the conference and identity of ones of the plurality of telecommunication terminals to be directly connected to the conference; and communicating to each conference manager controlling each subconference the identity of each of a set of the plurality of telecommunication terminals assigned to each subconference and the time of the conference.

DETAILED DESCRIPTION

Figure 1:
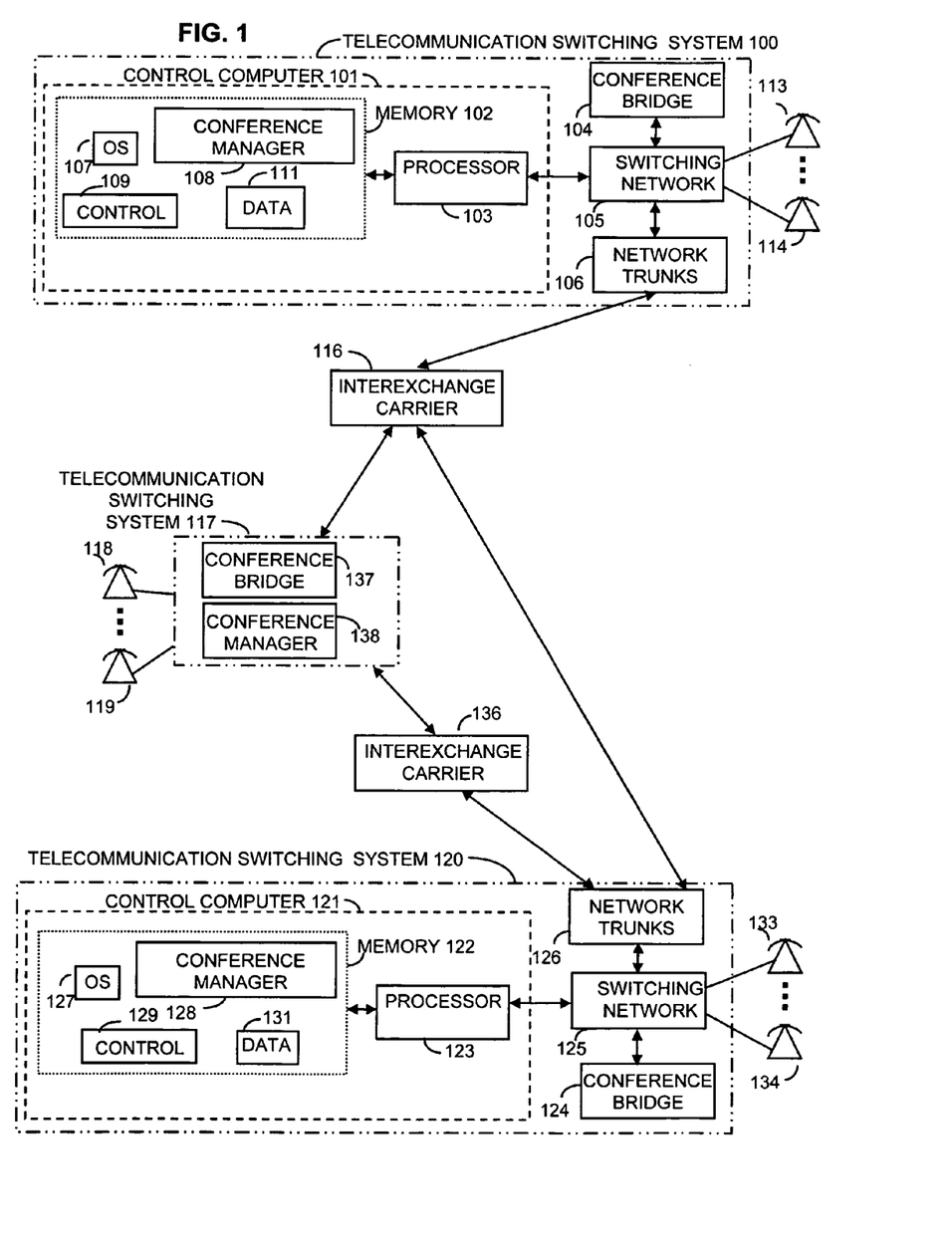
FIG. 1 illustrates a system for implementing a distributed conference.

FIG. 1 illustrates an embodiment for providing control over distributed conferencing among a plurality of telecommunication switching systems. Each telecommunication switching system is capable of performing conferencing operations by using an internal conference bridge. One skilled in the art would readily see that the telecommunication switching systems could be stand-alone conferencing systems. In addition, the telecommunication switching systems could also be central offices or Enterprise Switching Systems also referred to as Business Communication Systems.

Telecommunication switching system 100 is interconnected to telecommunication switching system 117 and telecommunication switching system 120 via interexchange carrier 116. In addition, telecommunication switching system 100 can be interconnected to telecommunication switching system 120 via interexchange carrier 116, telecommunication switching system 117, and exchange carrier 136. Interexchange carriers 116 and 136 may comprise elements of the long-distance public telephone switching network, packet networks, Internet, etc. or any other communication switching means known to those skilled in the art.

FIG. 1 illustrates telecommunication terminals 113-114, 118-119, and 133-134 being interconnected to telecommunication switching systems 100, 117, and 120, respectively. These telecommunication terminals may be standard telephone sets or multimedia telecommunication devices capable of communicating on a multimedia conference. Although the telecommunication terminals are illustrated to be directly connected to the telecommunication switching systems, one skilled in the art could readily envision that these telecommunication terminals could be interconnected via other communication switching equipment such as the public switching telephone network or the Internet.

In telecommunication switching system 100, control computer 101 provides overall control of the operations performed by telecommunication switching system 100. Conference bridge 104 is responsive to audio and multimedia information from switching network 105 to combine this information and transfer the results back via switching network 105 to the proper destinations. Network trunks 106 provides the interface to other switching systems such as interexchange carrier 116. Note, if telecommunication terminal 113 is connected to switching system 100 via a central office or other type of switching system, the connection will be made via network trunks 106 to switching network 105. Telecommunication switching system 117 and 120 are similar in structure. Note, only conference bridge 137 and conference manager 138 are illustrated in FIG. 1 as being part of telecommunication switching system 117; but other elements similar to those elements of telecommunication switching system 100 are also present in telecommunication switching system 117.

Within control computer 101, processor 103 controls the operations by executing programs stored in memory 102 utilizing data stored within memory 102. Operating system 107 provides overall control of control computer 101. Control application 109 is executed by processor 103 to control the operations of conference bridge 104, switching network 105, and network trunks 106. Conference manager 108 provides the overall control for conferences which are hosted by conference bridge 104. Conference manager 108 also participates in control of a conference in which one of the telecommunication terminals 113-114 participates even if that conference is not hosted by conference bridge 104. Conference manager 108 controls the conference and subconferences to lower telecommunication costs. Telecommunication costs include telecommunication transport costs and/or conference port costs.

Conference manager 108 communicates with control application 109 to control the operations of elements 104-106. Conference manager 108 utilizes data stored in data 111 to provide the overall conference control. In addition, conference manager 108 communicates with conference manager 128 and conference manager 138 in telecommunication switching systems 117 and 120, respectively, to set up distributed conferences.

Consider the following example to illustrate the operation of an embodiment of the system illustrated in FIG. 1. For sake of example, assume that telecommunication switching system 100 and telecommunication terminals 113-114 are located in the United States; whereas telecommunication switching system 117 and telecommunication terminals 118-119 are located in Perth, Australia and that telecommunication switching system 120 and telecommunication terminals 133-134 are located in Sydney, Australia.

Assume that a user of telecommunication terminal 113 reserves a "meet me" conference on telecommunication switching system 100 by interacting with conference manager 108 via processor 103 and switching network 105. The user then distributes the conference identification information received from conference manager 108 to the other participants in the conference. This identification information will allow the other participants to gain access to the conference call and is well known to those skilled in the art. Further assume that the user distributed the conference identification information to the users of telecommunication terminals 114, 118, 119, 133, and 134.

Assume that telecommunication terminals 113 and 114 are first to enter the conference. Control manager 108 is responsive to information from telecommunication terminals 113 and 114 to conference these telecommunication terminals together via conference bridge 104.

Next, telecommunication terminal 133 enters the conference by setting up a call to telecommunication switching system 100 utilizing the conference identification information via switching network 125, network trunks 126, interexchange carrier 116 under the control of control application 129. Conference manager 108 is responsive to this call to add telecommunication terminal 133 into the conference on conference bridge 104. Next, telecommunication terminal 134 enters the conference by setting up a call to telecommunication switching system 100 utilizing the same path as telecommunication terminal 133.

Conference manager 108 is responsive to the call from telecommunication terminal 134 to determine that telecommunication terminal 133 is also located at the same geographic location. Conference manager 108 then establishes communication with conference manager 128 of telecommunication switching system 120. In response to this communication, conference manager 128 establishes a subconference on conference bridge 124 between telecommunication terminals 133 and 134 so as to reduce telecommunication costs. Conference manager 128 in conjunction with conference manager 108 then extends this subconference to the conference taking place on conference bridge 104 of telecommunication switching system 100.

Next, telecommunication terminal 118 enters the conference by setting up a call to telecommunication switching system 100 via interexchange carrier 116 utilizing the conference identification information. Conference manager 108 is responsive to this call to determine that telecommunication terminal 118 is in a similar geographical location to telecommunication terminals 133 and 134 and that communication costs can be lowered by having telecommunication terminal 118 join the subconference on conference bridge 124. Conference manager 108 communicates with conference manager 128 and conference manager 138 to have the call from telecommunication terminal 118 rerouted through interexchange carrier 136 to conference bridge 124 to be combined into the subconference. Note, communication costs may be less if telecommunication terminals 133 and 134 were combined into a subconference with telecommunication terminal 118 on telecommunication switching system 117. If communication costs will be less by forming a subconference on switching system 117, such a subconference will be formed rather than a subconference on telecommunication switching system 120.

Next, telecommunication terminal 119 enters the conference by placing a call to telecommunication switching system 100 via interexchange carrier 116 using the conference identification information. Conference manager 108 is responsive to this call to communicate with conference manager 138 of telecommunication switching system 117 to establish a second subconference on conference bridge 137 telecommunication switching system 117 with telecommunication terminals 118 and 119. Conference manager 108 then makes the determination of whether communication costs can be lowered by having the second subconference joined into the first subconference on conference bridge 124 of telecommunication switching system 120 or whether the second subconference should be directly connected to the conference on conference bridge 104 of telecommunication switching system 100 via interexchange carrier 116. If lower communication costs can be achieved by having the second subconference connected to the first subconference, conference manager 108 communicates with conference manager 128 and conference manager 138 to accomplish this.

A second embodiment of operations based on the system illustrated in FIG. 1 allows a user of a telecommunication telephone to prearrange a distributed conference in which conference managers set up calls to the participating telecommunication terminals at the appropriate time.

The following is an example of the second embodiment. Telecommunication terminal 113 communicates with conference manager 108 of telecommunication switching system 100 and supplies to conference manager 108 the conference information such as starting time, ending time, and participating telecommunication terminals. Assuming that the same telecommunication terminals as in the previous example will participate in this prearranged conference, conference manager 108 communicates with conference manager 128 and conference manager 138 before the conference is to start. Assume that the lowest communication costs can be achieved by the arrangement of the conference and the two subconferences as in the previous example. At the start of the conference, conference manager 128 will form the first subconference on conference bridge 124 by contacting telecommunication terminals 133 and 134, conference manager 138 of telecommunication switching system 117 will contact telecommunication terminals 118 and 119 and form the second subconference on conference bridge 137, conference manager 108 will contact telecommunication terminals 113 and 114 and form the conference on conference bridge 104 and contact conference manager 128 and conference manager 138 of telecommunication switching system 117 to have the subconferences joined with the conference on conference bridge 104.

Figure 2:
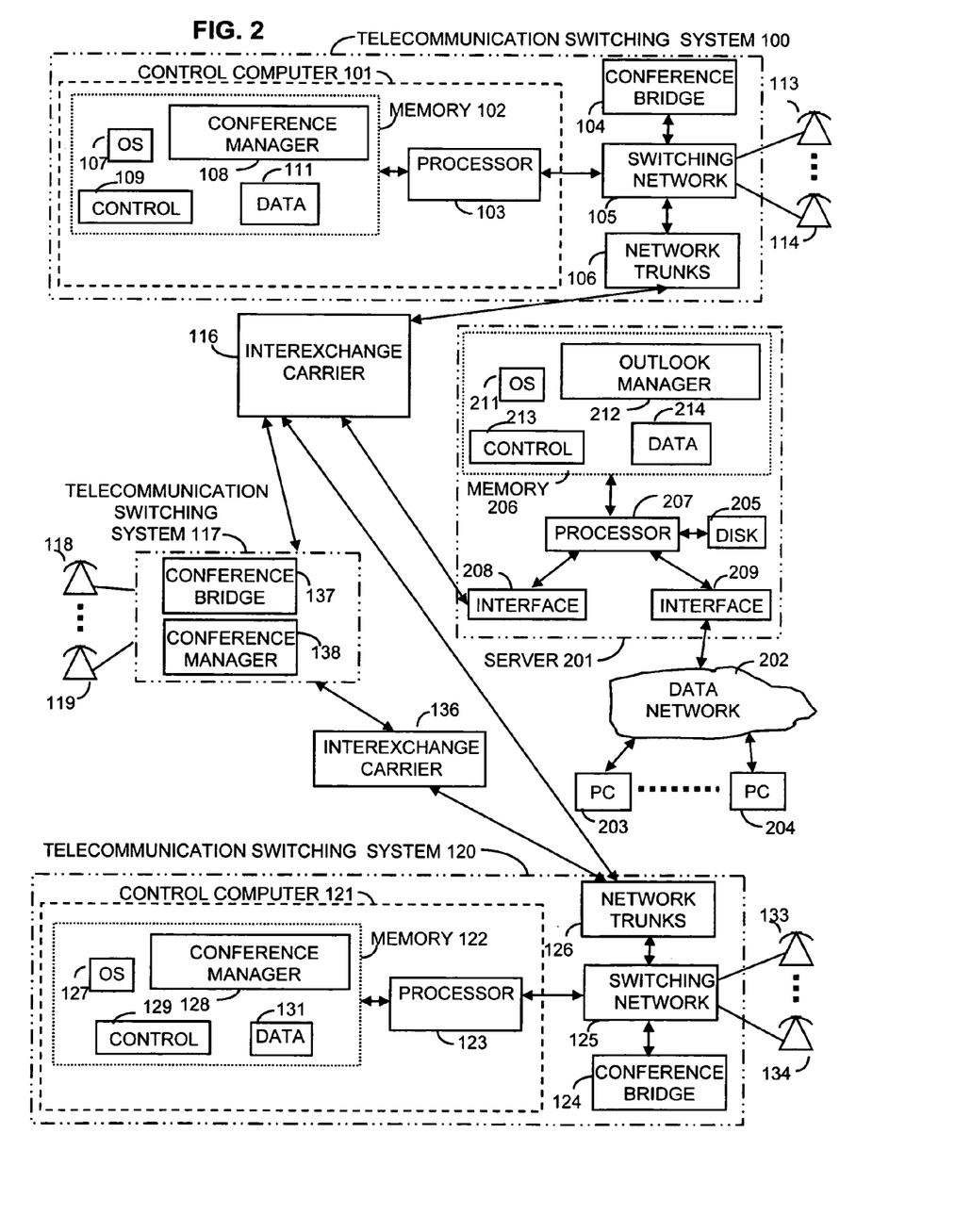
FIG. 2 illustrates another system for implementing a distributed conference.

FIG. 2 illustrates another embodiment for providing control over distributed conferencing among a plurality of telecommunication switching systems. In FIG. 2, elements 100-136 are similar to those of FIG. 1; however, the operations performed are different. In FIG. 2, server 201 controls many of the functions for setting up the distributed conference call.

Server 201 provides the functions for supporting the Outlook programs executed by personal computers (PC) 203-204 via Outlook manager 212 (also referred to as a conference arranger). These functions are well known to those skilled in the art. In server 201, processor 207 executes programs and stores and retrieves data from memory 206. In addition, data is stored and retrieved from disk 205. Interface 208 provides an interface to interexchange carrier 116 which allows server 201 to communicate with all of the telecommunication switching systems of FIG. 2.

Server 201 is interconnected to PC 203-204 via data network 202 which may be one of the number of data networks well known to those skilled in the art. Each of the users assigned to telecommunication terminals 113-114, 118-119, and 133-134 is also assigned to a PC from the set of PC 203-204 for interaction with Outlook manager 212.

Operating system 211 when executed by processor 207 provides overall control of server 201. Outlook manager 212 provides the Outlook functions using data stored in data 214 and disk 205. Control application 213 provides control of other functions performed by server 201.

Consider the following example which performs similar operations to those of the examples for FIG. 1 but in a different way. The user of telecommunication terminal 113 is also assigned to PC 203. The user interacts with Outlook manager 212 via an Outlook program being executed by PC 203 to arrange a conference between telecommunication terminals 113, 114, 118, 119, 133, and 134. First, the user interacts with Outlook manager 212 to establish a conference time with the other participants using techniques well known to those skilled in the art. Once such a time has been established, Outlook manager 212 arranges for a prearranged conference that will be distributed among conference bridges 104, 124, and bridge 137 at the agreed upon time. Outlook manager 212 then communicates to conference manager 108 that a conference will occur with telecommunication terminals 113 and 114 conferenced directly on conference bridge 104, communicates to conference manager 128 that a first subconference will be established for telecommunications terminals 133 and 134 and a second subconference on telecommunication switching system 117. Outlook manager 212 also communicates to conference manager 138 that the second subconference is to be extended to the first subconference and also communicates to conference manager 128 that the first subconference is to be extended to the conference on conference bridge 104.

During the communication with the conference managers, Outlook manager 212 obtains the conference identification information from each of the conference managers. Outlook manager 212 also supplies to the conference managers the identification information for the telecommunication terminals that are to be part of the distributed conference. Outlook manager 212 communicates with the conference managers via interface 208 and interexchange carrier 116. After the distributed conference has been prearranged with the conference managers, Outlook manager 212 transmits to each user of a telecommunication terminal via that user's PC the identification information necessary for the user utilizing a telecommunication terminal to join the conference or subconference to which they have been assigned. At the prearranged time, the users utilize conference identification information to enter the conference or subconference to which they have been assigned. As the telecommunication terminals enter the conference and subconferences, conference managers 108, 128, and 138 combine the conference and subconferences in the prearranged configuration.

Figure 3:
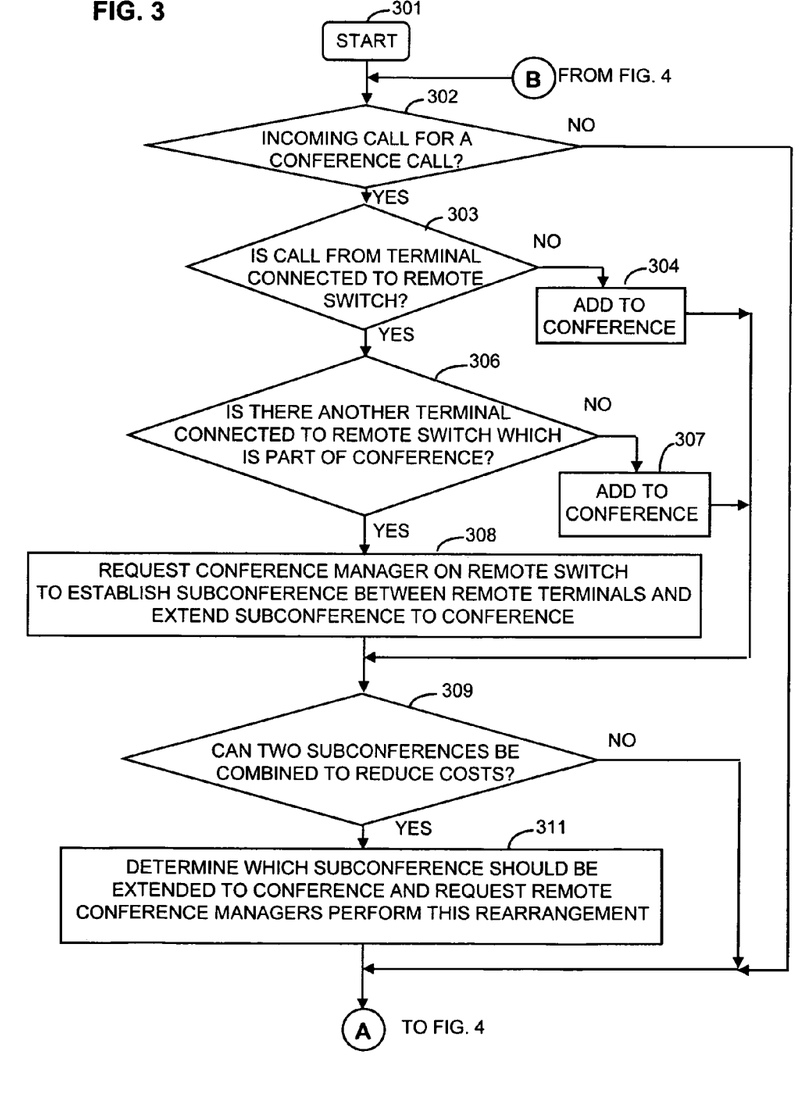
FIGS. 3 and 4 illustrate, in flowchart form, operations performed by an embodiment for implementing a distributed conference.
Figure 4:
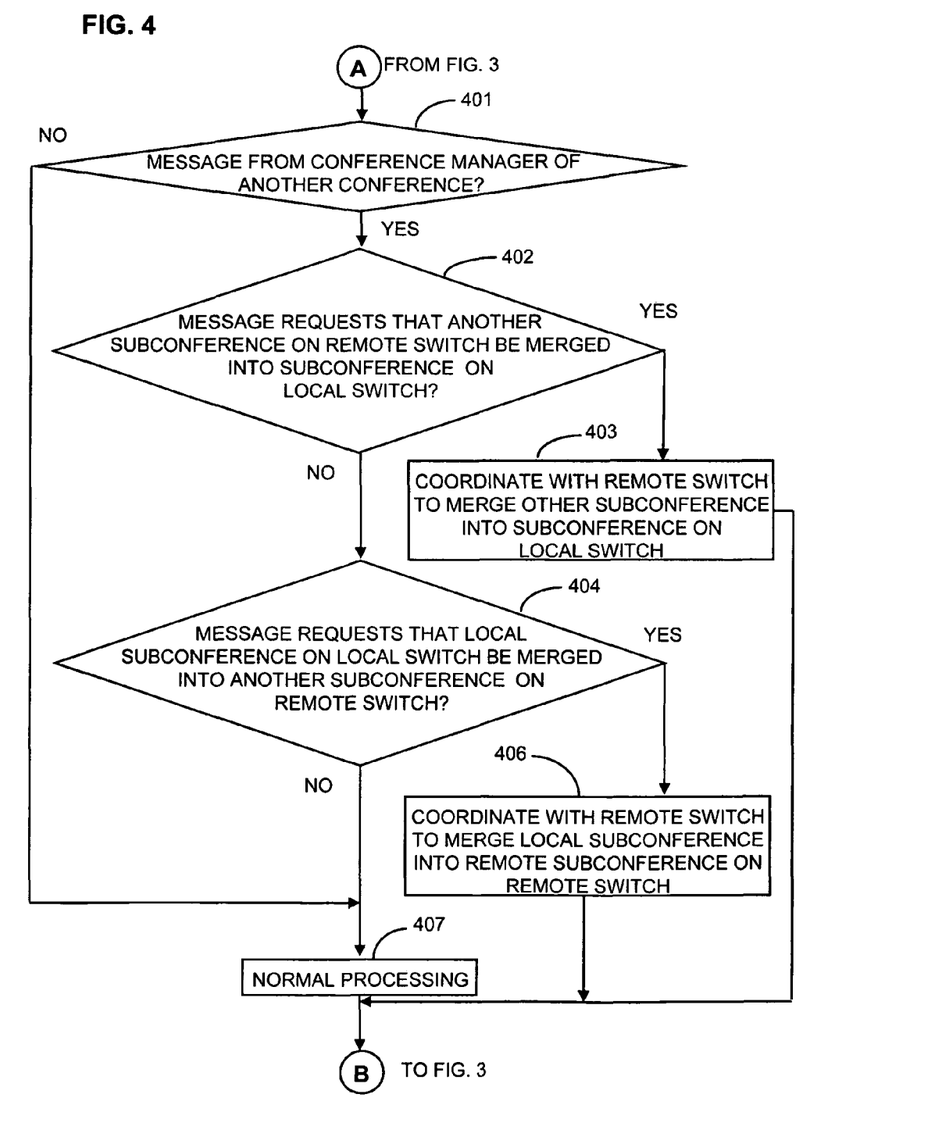

FIGS. 3 and 4 illustrate, in flowchart form, operations performed by a conference manager in the first embodiment. The conference manager may be controlling a number of conferences and subconferences. Blocks 301-311 of FIG. 3 illustrate the operations performed in controlling conferences and subconferences by a conference manager. Blocks 401-407 of FIG. 4 illustrate the operations performed by the conference manager in controlling subconferences in response to messages from a remote conference manager.

In FIG. 3, after being started in block 301, decision block 302 determines if there is an incoming call for any conference that is being managed by the conference manager on the local switch. If the answer is no, control is transferred to decision block 401 of FIG. 4. If the answer is yes in decision block 302, decision block 303 determines if the call is from a telecommunication terminal connected to a remote switch. If the answer is no, this means that the telecommunication terminal is on a local switch, and block 304 adds this telecommunication terminal into the conference before transferring control to decision block 309.

Returning to decision block 303, if the answer in decision block 303 is yes, decision block 306 determines if there is another remote telecommunication terminal presently on the conference call and connected to the same remote switch from which the call is being received. If the answer is no, this means that the calling remote telecommunication terminal is the only remote telecommunication terminal from that particular remote switch that is presently on the conference. If the answer is no, block 307 adds this remote telecommunication terminal into the conference before transferring control to decision block 309.

Returning to decision block 306, if the answer in decision block 306 is yes, block 308 transmits a request/message to the remote conference manager on the remote switch to establish a subconference between the remote telecommunication terminals and extend that subconference to the conference on the local switch. After execution of block 308, control is transferred to decision block 309.

Decision block 309 determines if there are two subconferences presently being extended to the conference which could be combined to reduce costs. If the answer is no, control is transferred to decision block 401 of FIG. 4. If the answer is yes, block 311 determines which of the two subconfences should be extended to the conference and request that the remote conference managers perform this rearrangement. This also requires that the unselected subconference be extended to the selected subconference before transferring control to decision block 401 of FIG. 4. Note, that the conference manager will continue to execute decision block 309 and block 311 on each execution of the operations of FIG. 3 so that all eligible subconferences will be combined.

FIG. 4 illustrates, in flowchart diagram form, the operations performed by the conference manager in controlling subconferences located on the local switch in response to messages from a conference manager on a remote switch. After receiving control, decision block 401 determines if a message has been received from a conference manager of another conference located on a remote switch. If the answer is no, control is transferred to block 407 which performs normal processing before transferring control back to decision block 302 of FIG. 3.

If the answer is yes in decision block 401, control is transferred to decision block 402 which determines if the message requests that another subconference on another remote switch be merged into the subconference on the local switch being managed by the conference manager. If the answer is yes, the conference manager coordinates with the conference manager of the other remote switch to merge the other subconference into the subconference on the local switch before transferring control back to decision block 302 of FIG. 3.

If the answer is no in decision block 402, decision block 404 determines if the message requests that the local subconference on the local switch be merged into another subconference on another remote switch. If the answer is no, control is transferred to block 407. If the answer is yes, by executing block 406, the conference manager on the local switch coordinates with the conference manager on the other remote switch to merge the local subconference into the remote subconference on the other remote switch before transferring control back to decision block 302 of FIG. 3.

Figure 5:
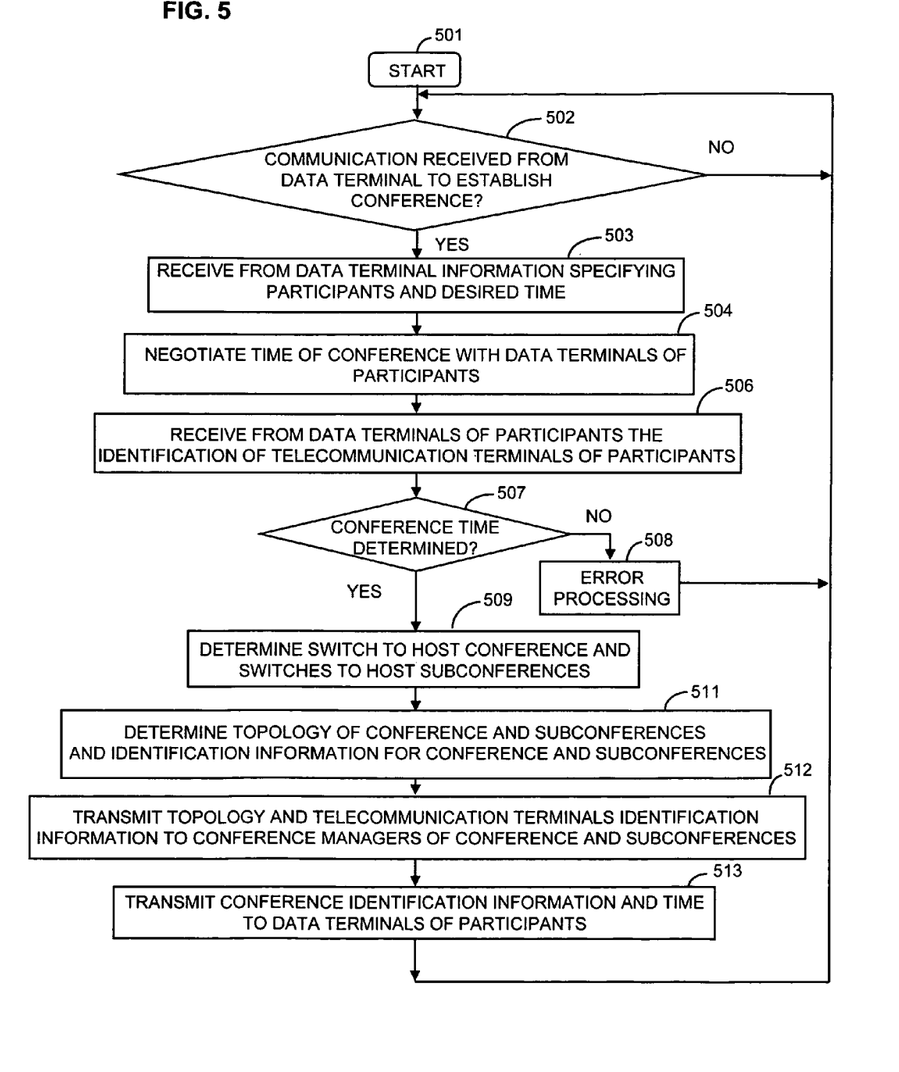
FIG. 5 illustrates, in flowchart form, operations performed by another embodiment for implementing a distributed conference.

FIG. 5 illustrates, in flowchart form, operations performed by another embodiment. The operations illustrated in FIG. 5 are performed by a calendar/appointment program such as Microsoft Outlook or any type of program capable of arranging and setting up conferences. After being started in block 501, decision block 502 determines if communication is being received from a data terminal to establish a conference. If the answer is no, decision block 502 is re-executed.

If the answer in decision block 502 is yes, block 503 receives from the data terminal information specifying the participants who are to participate in the conference and the approximate time for the conference to begin before transferring control to block 504.

Block 504 negotiates the time of the conference with the data terminals of the participants by determining from the calendar maintained by each of the participants' data terminal when each participant is available. Once such a time for the conference has been established, block 506 receives from each of the data terminals the identification of the corresponding telecommunication terminal used by each of the participants.

Decision block 507 makes the final determination that all of the necessary information has been received from the data terminals. If the answer is no in decision block 507, control is transferred to block 508 which performs error processing before returning control to decision block 502. If the answer is yes in decision block 507, control is transferred to block 509.

Block 509 determines on which switch the conference should be established. In addition, block 509 determines on which switches the subconferences should be established before transferring control to block 512.

Block 512 determines the path topology of the conference and subconferences and obtains from the corresponding conference manager the information identifying each conference and subconference before transferring control to block 513.

Block 513 transmits the conference identification information and time to the data terminals of the participants so as to inform the participants of the necessary conferencing information.

When the operations of a computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the computer, processor or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method of establishing and controlling a conference and subconferences for a plurality of telecommunication terminals so as to reduce telecommunication costs by a conference manager, comprising the steps of:

establishing the conference on a local switch by the conference manager;

adding each telecommunication terminal into the conference upon each telecommunication terminal requesting addition and being geographically located with the local switch;

adding each telecommunication terminal into the conference by the conference manager upon each telecommunication terminal requesting addition and being geographically remote from the local switch but being the only telecommunication terminal in its geographically location;

requesting by the conference manager that each remote conference manager establish a subconference between each first set of telecommunication terminals in the conference and geographically located with each remote conference manager and extend each of subconferences to the conference;

adding each telecommunication terminal requesting addition and being geographically remote from the local switch into a subconference geographically located with each telecommunication terminal; and requesting by the conference manager that a first and second remote conference manager extend a first subconference controlled by the first remote conference manager to the second subconference controlled by the second remote conference manager.

2. The method of claim 1 wherein the step of requesting by the conference manager that a first and second remote conference manager extend a first subconference further comprises determining by the conference manager that communication cost would be reduced by extending the first subconference to the second subconference.

3. The method of claim 2 wherein the conference and subconferences are multi-media.

4. A method of establishing and controlling a conference and subconferences so as to reduce telecommunication costs by a conference manager, comprising the steps of:

adding a first telecommunication terminal into the conference on a local switch directly controlled by the conference manager in response to an incoming telecommunication call upon the first telecommunication terminal being located with the local switch;

adding a first remote telecommunication terminal geographically located with a first remote switch into the conference on the local switch by the conference manager in response to a second incoming telecommunication call from the first remote telecommunication terminal upon the first remote telecommunication terminal being the only remote telecommunication terminal geographically located with the first remote switch in the conference;

requesting by the conference manager that a first remote conference manager on the first remote switch form a first subconference on the first remote switch with the first remote telecommunication terminal and a second remote telecommunication terminal and extend the first subconference to the conference in response to a third incoming telecommunication call from the second remote telecommunication terminal upon the second remote telecommunication terminal being geographically located with the first remote switch;

adding a third remote telecommunication terminal located with a second remote switch into the conference on the local switch by the conference manager in response to a fourth incoming telecommunication call from the third remote telecommunication terminal upon the third remote telecommunication terminal being the only remote telecommunication terminal geographically located with the second remote switch in the conference;

requesting by the conference manager that a second remote conference manager on the second remote switch form a second subconference on the second remote switch with the third remote telecommunication terminal and a fourth remote telecommunication terminal and extend the second subconference to the conference in response to a fifth incoming telecommunication call from the fourth remote telecommunication terminal upon the fifth remote telecommunication terminal being geographically located with the second remote switch; and requesting by the conference manager that the first and second remote conference managers extend the second subconference to the first subconference in response to a determination by conference manager that communication cost will be lowered.

5. The method of claim 4 further comprises requesting by the conference manager that the remote conference manager add a fifth remote telecommunication terminal into the first remote subconference in response to sixth incoming telecommunication call from the fifth remote telecommunication terminal upon the fifth remote telecommunication terminal being geographically located with the first remote switch.

6. The method of claim 5 wherein the conference and subconferences are multi-media.

7. A method of pre-arranging a conference for a plurality of telecommunication terminals so as to reduce telecommunication costs by a conference arranger wherein each of the plurality of telecommunication terminals is associated with a data terminal, comprising the steps of:

receiving from a data terminal associated with one of the plurality of telecommunication terminals a request to arrange a conference wherein the request includes the identity of data terminals to be contacted and a approximate time for the conference;

contacting the identified data terminals to determine a time for the conference using the approximate time and identity of each of the telecommunication terminals associated with the identified data terminals to determine a time of the conference;

determining assignments of the plurality of telecommunication terminals to the conference and subconferences and interconnection of subconferences to minimize telecommunication cost;

communicating to a conference manager controlling the conference the time of the conference and identity of ones of the plurality of telecommunication terminals to be directly connected to the conference; and communicating to each conference manager controlling each subconference the identity of each of a set of the plurality of telecommunication terminals assigned to each subconference and the time of the conference.

8. The method of claim 7 further comprises the steps of communicating to each data terminal of each of the plurality of telecommunication terminals assigned to the conference the time and identity of the conference; and communicating to each data terminal of each of the plurality of telecommunication terminals assigned to each subconference the time and identity of each subconference.

9. The method of claim 8 wherein the conference and subconferences are multi-media.

10. A non-transitory computer-readable medium for establishing and controlling a conference and subconferences for a plurality of telecommunication terminals so as to reduce telecommunication costs by a conference manager, comprising computer-executable instructions configured for:

establishing the conference on a local switch by the conference manager;

adding each telecommunication terminal into the conference upon each telecommunication terminal requesting addition and being geographically located with the local switch;

adding each telecommunication terminal into the conference by the conference manager upon each telecommunication terminal requesting addition and being geographically remote from the local switch but being the only telecommunication terminal in its geographically location;

requesting by the conference manager that each remote conference manager establish a subconference between each first set of telecommunication terminals in the conference and geographically located with each remote conference manager and extend each of subconferences to the conference;

adding each telecommunication terminal requesting addition and being geographically remote from the local switch into a subconference geographically located with each telecommunication terminal; and requesting by the conference manager that a first and second remote conference manager extend a first subconference controlled by the first remote conference manager to the second subconference controlled by the second remote conference manager.

11. The method of claim 10 wherein the computer-executable instructions of the conference manager for requesting that a first and second remote conference manager extend a first subconference further comprises computer-executable instructions for determining that communication cost would be reduced by extending the first subconference to the second subconference.

12. The method of claim 11 wherein the conference and subconferences are multi-media.

13. A non-transitory computer-readable medium for pre-arranging a conference for a plurality of telecommunication terminals so as to reduce telecommunication costs by a conference arranger wherein each of the plurality of telecommunication terminals is associated with a data terminal, comprising computer-executable instructions configured for:

receiving from a data terminal associated with one of the plurality of telecommunication terminals a request to arrange a conference wherein the request includes the identity of data terminals to be contacted and a approximate time for the conference;

contacting the identified data terminals to determine a time for the conference using the approximate time and identity of each of the telecommunication terminals associated with the identified data terminals to determine a time of the conference;

determining assignments of the plurality of telecommunication terminals to the conference and subconferences and interconnection of subconferences to minimize telecommunication cost;

communicating to a conference manager controlling the conference the time of the conference and identity of ones of the plurality of telecommunication terminals to be directly connected to the conference; and communicating to each conference manager controlling each subconference the identity of each of a set of the plurality of telecommunication terminals assigned to each subconference and the time of the conference.

14. The computer-readable medium claim 13 further comprises computer-executable instructions for communicating to each data terminal of each of the plurality of telecommunication terminals assigned to the conference the time and identity of the conference; and computer-executable instructions communicating to each data terminal of each of the plurality of telecommunication terminals assigned to each subconference the time and identity of each subconference.

15. The method of claim 14 wherein the conference and subconferences are multi-media.

\* \* \* \* \*